United States Patent [19]

Laine

[11] 4,017,059
[45] Apr. 12, 1977

[54] DEVICE FOR STRESSING WITH A LIMITED FORCE, IN PARTICULAR FOR A BELT TENSIONER

[75] Inventor: Gabriel Laine, Andresy, France
[73] Assignee: Automobiles Peugeot, Paris, France
[22] Filed: Aug. 12, 1976
[21] Appl. No.: 713,976
[30] Foreign Application Priority Data
Sept. 11, 1975 France .................................. 75.27854
[52] U.S. Cl. .................................. 254/54; 254/67; 254/100; 81/52.4 R
[51] Int. Cl.$^2$ .................................. B66F 3/08
[58] Field of Search .................. 254/54, 67, 100; 81/52.4 R, 52.4 A, 52.5

[56] References Cited
UNITED STATES PATENTS

| | | |
|---|---|---|
| 2,733,622 | 2/1956 | Evans .................................. 81/52.4 R |
| 3,906,819 | 9/1975 | Curtis .................................. 81/52.4 R |
| 3,920,219 | 11/1975 | Hendrix .................................. 254/100 |

Primary Examiner—Al Lawrence Smith
Assistant Examiner—Robert C. Watson
Attorney, Agent, or Firm—Burns, Doane, Swecker & Mathis

[57] ABSTRACT

The device comprises a fixed body, a screw cooperating with a nut, and springs. The nut is disposed in the body between two abutments. A releasable clutch device is interposed between the nut and one of the abutments. The springs are interposed between the nut and the other abutment. A pawl mechanism is provided between the body and the nut.

The device has an interesting application in a belt tensioner.

12 Claims, 6 Drawing Figures

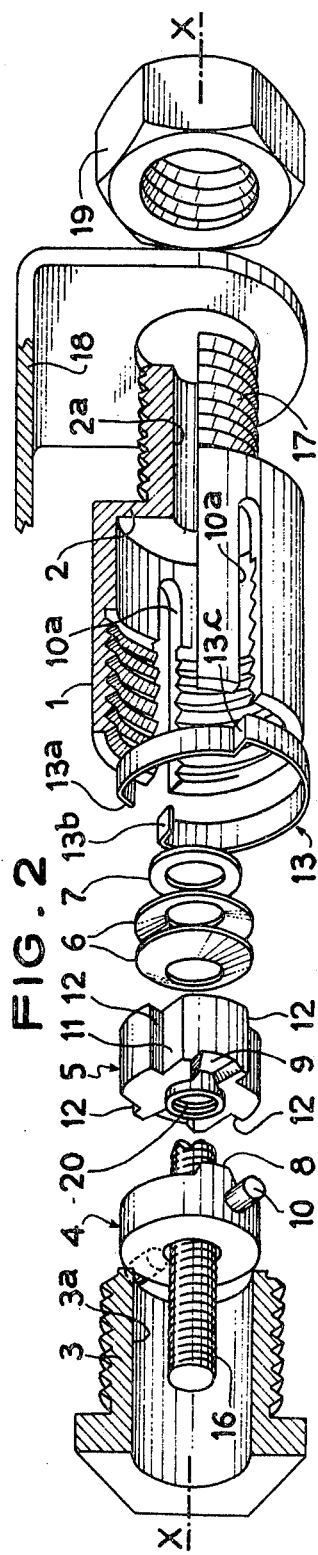
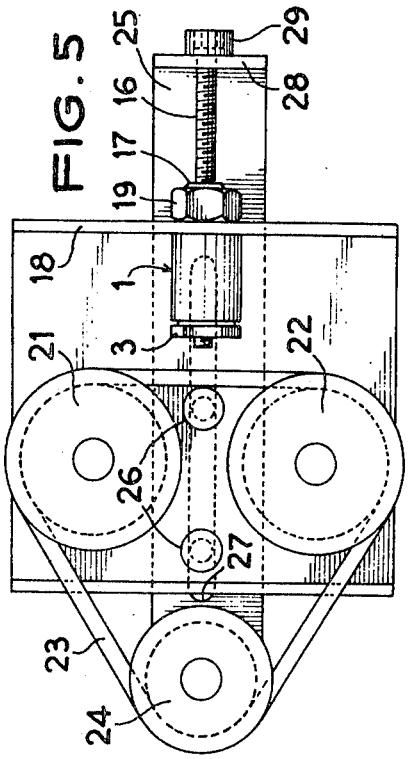
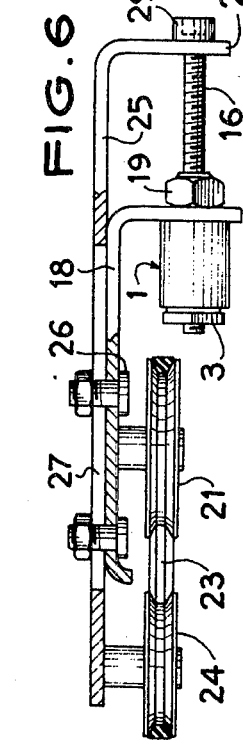
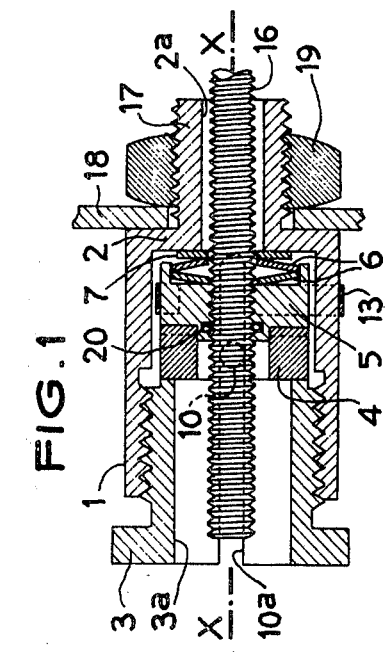
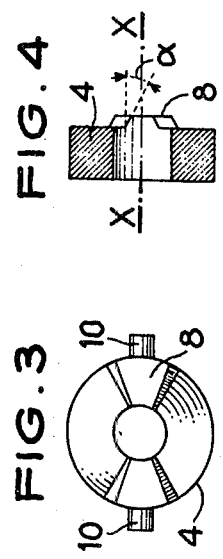

DEVICE FOR STRESSING WITH A LIMITED FORCE, IN PARTICULAR FOR A BELT TENSIONER

The present invention relates to a device for stressing by a screw action so as to limit the force applied to a given value.

It is known that it is possible to limit the force transmitted by a screw by employing a dynamometric wrench or spanner for tightening this screw. However, this means does not take into account the force transmitted by the screw but the torque exerted on the head of the screw. Now, there may be a wide dispersion in the ratio between the torque and the axial force transmitted by the screw owing to the state of the surface of the rubbing parts, for example the screwthread and the bearing face of the head of the screw.

Other arrangements also exist for obtaining the same result but which have the same drawbacks, namely a wide dispersion of the ratio between the torque and the axial force transmitted depending on the state of the surface of the parts in rubbing contact.

Moreover, the use of a dynamometric wrench requires a correct setting of the latter in accordance with the work to be carried out, otherwise the force transmitted does not correspond to the intended force.

Devices are also known in which there are incorporated means for controlling the force exerted. These means are usually visual and involve a measurement or a checking of a spring compression travel. They are therefore dependent on the operator.

An object of the invention is to overcome these various drawbacks and to provide a particularly simple means for limiting the force incorporated in a stressing device acting on an element which is movable or adjustable with respect to a fixed support, said device being arranged to become automatically released when the required force has been reached.

According to the invention there is provided a stressing device acting on an element which is movable or adjustable with respect to a fixed support, comprising a screw, a nut and at least one elastically yieldable means adapted to determine the applied force, wherein the nut is disposed between two abutments integral with the fixed support, the nut and a first of said abutments being provided with complementary means for ensuring therebetween a releasable connection and the elastically yieldable means being disposed between the nut and the second abutment.

The second abutment therefore withstands the force which is exerted by the screw and is transmitted through the nut and the elastically yieldable means.

The aforementioned complementary means preferably comprise radial notches formed on the confronting faces of the nut and abutment. The flanks of these notches are advantageously inclined.

According to other features:

A pawl mechanism is placed between the nut and the fixed support so as to prevent the nut from being driven in rotation by the screw when the latter is rotated in the direction in which the force exerted tends to decrease.

One of the abutments is axially adjustable in position with respect to the fixed support so as to permit adjusting the limit force transmitted by the screw.

Another object of the invention is to provide a belt tensioner comprising a device of the type defined hereinbefore.

One embodiment and an example of application will be described hereinafter with reference to the accompanying drawings in which:

FIG. 1 is a longitudinal sectional view of a device according to the invention;

FIG. 2 is an exploded view, with a part cut away, of the device;

FIG. 3 is a detail view of an abutment;

FIG. 4 is an axial sectional view of the abutment shown in FIG. 3, and

FIGS. 5 and 6 show an example of application of the invention respectively in elevation and in plan, with a part cut away.

The device shown in FIGS. 1 to 6 is contained in a body 1 constituted by a hollow cylinder having an axis X—X and closed at one end by a wall 2 and at the other end by a screwthreaded plug 3. The wall 2 and plug 3 have coaxial bores $2^a$, $3^a$.

Disposed between the plug 3 and the wall 2 in the following order are: a washer 4 constituting an abutment, a nut 5, two elastically yieldable washers 6 of the Belleville type, and a flat washer 7 acting as a support and abutment for the washers 6.

The washer 4 has, on the side thereof facing the nut 5, radial ribs 8 which engage in recesses or notches 9 formed in the adjacent face of the nut 5. Preferably, the flanks of the ribs 8 and recesses 9 are inclined and make with a straight line parallel to the axis X—X an angle α the tangent of which is roughly equal to the coefficient of friction of the contacting faces. These ribs and recesses constitute radial dogs and provide a releasable connection between the nut and the washer 4. The latter also has two outer radial lugs 10 which respectively engage two longitudinal grooves $10^a$ in the body 1. The nut 5 has on the periphery thereof recesses or notches 11 having a substantially radially extending face 12 on which can bear the end $13^a$ of a spring 13 constituted by a bent strip disposed between the nut 5 and the body 1, on which body it is maintained by passing through grooves $10^a$. For this purpose, the strip has two roughly radially extending portions $13^b$ and $13^c$. It will be understood that the grooves $10^a$ need not extend to the end of the body 1 and instead separate apertures could be provided in the wall of the body 1. However, the illustrated arrangement is preferred since it simplifies manufacture and assembly.

A screw 16 cooperates with the nut 5 and extends through the plug 3 and wall 2, the latter being extended by a screwthreaded spigot 17 whereby it is possible to fix the assembly on a support 18 by means of a nut 19.

Disposed inside the nut 5 and in contact with the screw 16 is a ring 20, for example of plastics material, for producing a notable friction between the screw and the nut. Such means are conventionally employed as a brake which precludes rotation of the nut.

FIGS. 5 and 6 show an application of the device according to the invention to a belt tensioner, the fixed support 18 carrying two recessed V-grooved 21, 22 around which there extends a V-sectioned belt 23 which also extends around a third pulley 24. The pulley 24 is carried by a movable and adjustable member 25 which can be held stationary with respect to the fixed support 18 by means of bolts 26 extending through an aperture 27.

The movable member 25 has a tab 28 through which the screw 16 extends, the latter bearing against the tab 28 by a head 29.

The device just described operates in the following manner:

In order to put the belt 23 under the desired tension, the bolts 26 are first untightened so as to release the movable member 25. Then the screw 16 is rotated in the direction for tightening by means of a conventional spanner. The tightening is rendered possible by the fact that the nut 5 is prevented from rotating by the recesses 9 which are retained by the ribs 8 of the abutment 4. The force for tensioning the belt 23 is transmitted to the fixed support 18 through the movable member 25, the screw 16, the nut 5 and the radial washers 6.

Beyond a certain force, the Belleville washers 6 are crushed so that the ribs 8 gradually disengage from the recesses 9.

As soon as this disengagement occurs, the nut 5 is released for rotation and it starts to rotate with the screw so that it is no longer possible to continue to tension the belt. The function of the ring 20 is to produce sufficient friction to enable the nut 5 to be driven by the screw 16 as soon as the ribs 8 are disengaged, not withstanding the resistance opposed to this movement by the friction of the Belleville washers 6 and the washer 7.

It is interesting to note that the operator is made aware of the end of the tightening by the tapping noise produced by the spring 13 whose end $13^a$ jumps from one recess 11 to the following.

The preferred value given to the angle $\alpha$ has for purpose to avoid the transmission to the Belleville washers 6 of a parasitic force coming from the reaction of the recesses 9 on the ribs 8.

The adjustment of the force for which the release occurs may be obtained by acting on the position of the screwthreaded plug 3 so as to modify the distance between the washer 4 and the wall 2 of the body 1 and thereby vary the calibration or prestressing of the Belleville washers. This releasing force is a function of the chosen calibration and does not depend on the state of the surfaces of the parts in frictional contact, so that the desired result is obtained in a reliable and effective manner.

To release the belt 23, it is merely necessary to rotate the screw 16 in the unscrewing direction. The nut 5 then cannot be driven in rotation since it is held stationary by the spring 13 which abuts against the face 12 of one of the recesses 11.

Having now described my invention what I claim as new and desire to secure by Letters Patent is:

1. A stressing device for acting on an element which is movable or adjustable with respect to a fixed support, the device comprising means defining a body for fixing to the support, a screw, a nut and coaxial with and cooperative with the screw, elastically yieldable means adapted to determine the force applied on the element, two abutments integral with the body the nut being interposed between the abutments, complementary means respectively provided on the nut and a first of said abutments for ensuring a releasable connection between the nut and the first abutment, the elastically yieldable means being disposed between the nut and a second of said abutments.

2. A device as claimed in claim 1, wherein the complementary connecting means comprise radial clutch dogs formed on confronting faces of the nut and the first abutment.

3. A device as claimed in claim 2, wherein the dogs have inclined flanks.

4. A device as claimed in claim 3, wherein the flanks make with a straight line parallel to the axis of the nut an angle $\alpha$ whose tangent is substantially equal to the coefficient of friction of the contacting faces of the nut and washer.

5. A device as claimed in claim 1, wherein a pawl mechansim is interposed between the nut and the body so as to prevent the nut from being driven in rotation by the screw when the screw is rotated in a direction in which the force exerted by the device tends to decrease.

6. A device as claimed in claim 5, wherein the pawl mechanism comprises recesses on a periphery of the nut each of which recesses defines a radial face, and a bent metal strip which is fixed against rotation with respect to the body and has one end portion which elastically bears against the periphery of the nut.

7. A device as claimed in claim 1, wherein one of the abutments is axially adjustable in position with respect to the body so as to permit adjusting the limit force transmitted by the screw.

8. A device as claimed in claim 1, wherein the body is a hollow cylindrical body and a wall defining an axial passage closes one end of the body and a screwthreaded plug also defining an axial passage closes an opposite end of the body, the body enclosing the two abutments, the nut and the elastically yieldable means.

9. A device as claimed in claim 8, wherein the first abutment comprises a washer having a radial lug and the body comprises a cavity, in which cavity the lug is received.

10. A device as claimed in claim 6, wherein the first abutment comprises a washer having a radial lug and the body comprises a cavity, in which cavity the lug is received, said cavity also receiving the metal strip of the pawl.

11. A device as claimed in claim 1, further comprising a brake between the screw and the nut.

12. A belt tensioner comprising a fixed support carrying a first pulley, and a member carrying a second pulley, means provided between the fixed support and said member to ensure the guiding of the member in a given direction and its locking in a chosen position, and a device for regulating the belt tension, the device comprising means defining a body in fixed relation to the support, a screw, a nut and coaxial with and cooperative with the screw, elastically yieldable means adapted to determine the force applied on the element, two abutments integral with the body the nut being interposed between the abutments, complementary means respectively provided on the nut and a first of said abutments for ensuring a releasable connection between the nut and the firt abutment, the elastically yieldable means being disposed between the nut and a second of said abutments, and the screw bearing against said movable member.

* * * * *